Dec. 11, 1951     W. C. BALTZELL     2,578,034
ELECTRICAL COOKING APPARATUS
Filed Feb. 15, 1949     3 Sheets-Sheet 1
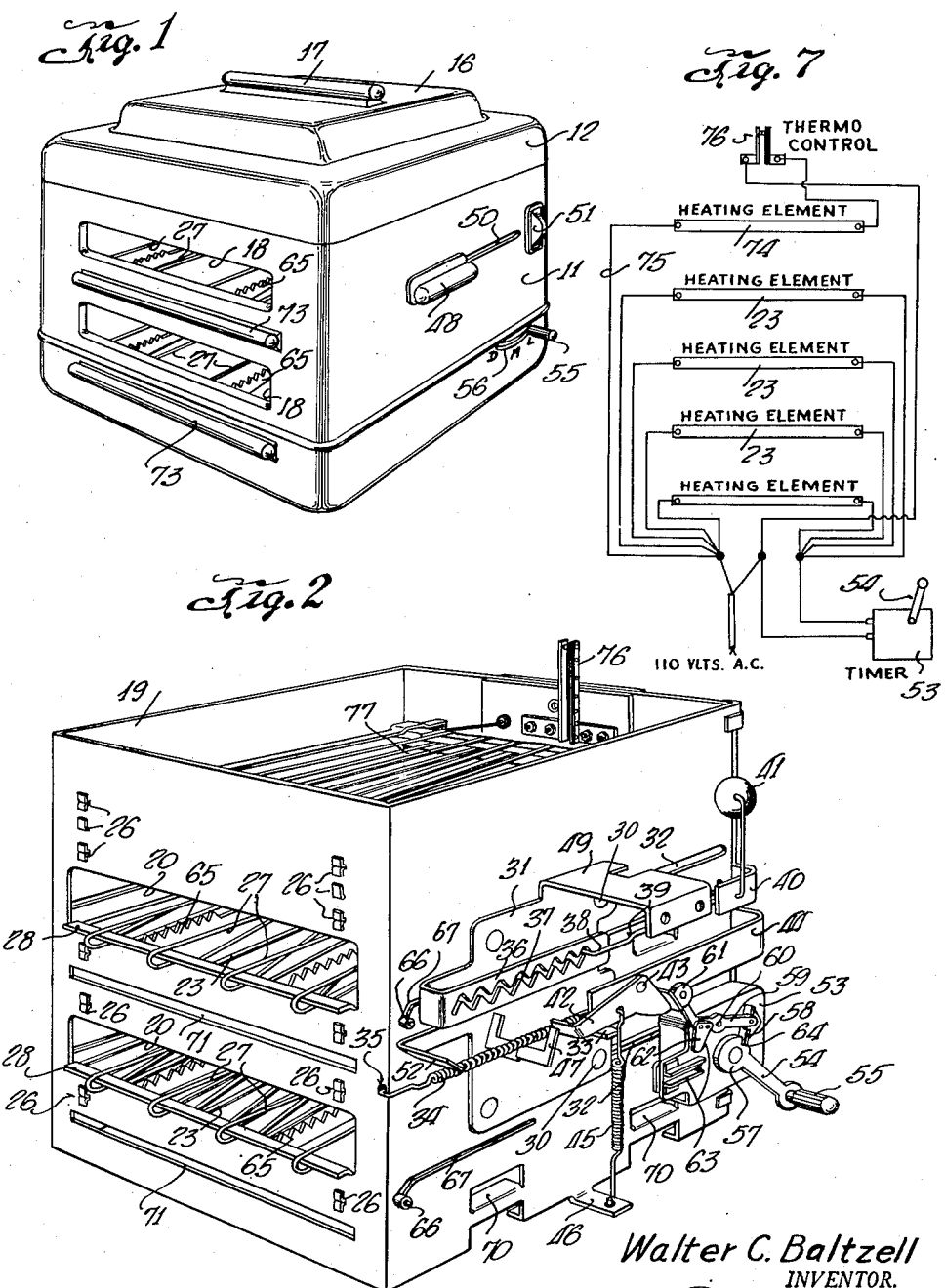
Walter C. Baltzell
INVENTOR.
ATTORNEY Dec. 11, 1951   W. C. BALTZELL   2,578,034
ELECTRICAL COOKING APPARATUS
Filed Feb. 15, 1949   3 Sheets-Sheet 2

Walter C. Baltzell
INVENTOR.

BY
ATTORNEY

Dec. 11, 1951 W. C. BALTZELL 2,578,034
ELECTRICAL COOKING APPARATUS
Filed Feb. 15, 1949 3 Sheets-Sheet 3

Walter C. Baltzell
INVENTOR.

BY

ATTORNEY

Patented Dec. 11, 1951

2,578,034

UNITED STATES PATENT OFFICE 2,578,034

ELECTRICAL COOKING APPARATUS

Walter C. Baltzell, Dallas, Tex., assignor of one-fifth to Charles W. Baltzell, Dallas, Tex.

Application February 15, 1949, Serial No. 76,573

4 Claims. (Cl. 99—327)

This invention relates to electrical cooking apparatus and it has particular reference to toasters.

The principal object of the invention is to provide an electric toaster so designed and constructed that slices of bread, buns and the like are received on horizontally disposed rails and thus may retain any suitable form of spread. Moreover, automatic receiving and ejection of the toasted food is accomplished under control of an adjustable timer equipped with means for predetermining the period of exposure of the food to the heating coils of the toaster. Associated with the ejector is a plurality of serrated bars effective to convey the toasted food inwardly of the toaster housing and subsequent to the toasting operation, followed by actuation of the ejector, the serrated bars recede from the food by virtue of slots formed in the walls of the case containing the mechanism and which is embraced by the housing. Thus, the toasted food is moved to an accessible position exteriorly of the housing.

Another object of the invention is to provide a governor for controlling the operating speed of the ejecting mechanism and which, at the same time, constitutes an audible signal indicating completion of the toasting operation.

Still another object of the invention is to provide a warming chamber having an individual heating element which is thermostatically maintained at a predetermined temperature unaffected by the heating elements of the toasting compartments, there being one above and one below each of said compartments for simultaneous toasting of both sides of the bread slice or bun, as the case may be. Provision is also made to separate the heating element of the warming chamber from the toasting elements by means of a heat reflecting plate which has the effect not only to obviate influencing the temperature of the warming chamber by the toasting elements but also to intensify the heat of the latter.

Yet another object of the invention is to provide removable drip pans below each of the food supporting rails to receive melted butter, cheese or other materials likely to flow off the edges of the bread being toasted.

With the foregoing objects in view, the invention has further reference to certain features of accomplishment which will become apparent as the description proceeds, taken in connection with the accompanying drawings wherein:

Figure 1 is a perspective view of a toaster constructed according to the invention.

Figure 2 is a perspective view of the inner case of the toaster adapted to contain the mechanism thereof.

Figure 7 is a diagrammatic view of the wiring and circuits of the toaster.

Figure 3:
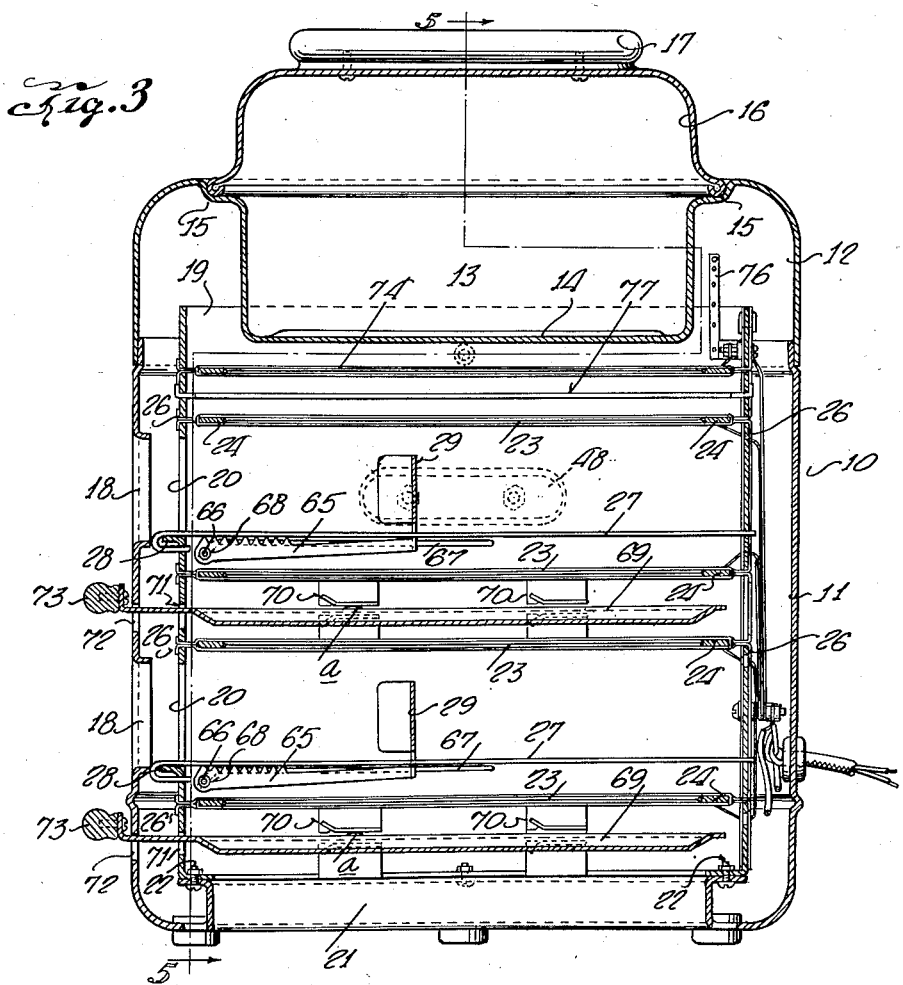
Figure 3 is a vertical sectional view of the toaster on a slightly enlarged scale, taken on line 3—3 of Figure 5.

Continuing with a more detailed description of the drawings, reference numeral 10 denotes generally the outer case or housing of the toaster which is formed preferably in lower and upper sections 11 and 12 the latter being drawn to produce a chamber 13 adapted to receive food which is to be kept warm. The floor of the chamber 13 is corrugated as at 14 to obviate sweating and to avoid any likelihood that the bread slices or other food stored therein may become overdone from a heating element immediately below the chamber and which will be later identified by a reference numeral.

The perimeter of the chamber 13 is offset to define a shoulder 15 on which rests the edges of a domed cover 16, the latter being provided with a handle 17.

The front of the housing 10 is provided with horizontal elongated openings 18, vertically spaced and through which the toasted slices of bread, buns or the like are ejected in the manner to be presently described.

In Figure 2 is shown the inner case 19 of the toaster, whose top and bottom are open and in the front wall of the case are two horizontally elongated openings 20 and vertically spaced so that they will be in register with the openings 18 of the housing 10. At the bottom of the housing 10, the metal is turned upwardly and outwardly to form a flanged support 21 for the inner case 19 and to which the bottom of the latter is secured by screws 22.

Figure 6:
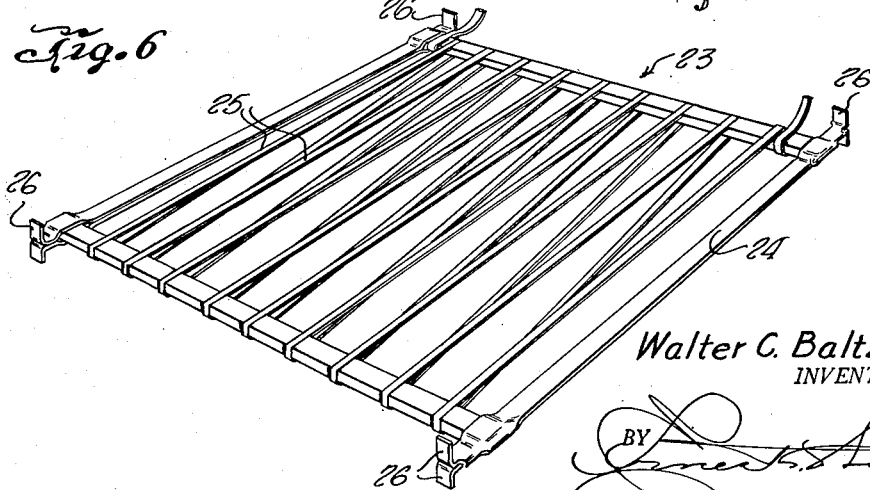
Figure 6 is a perspective view of one of the electrical heating elements.

In Figure 6 is shown one of the electrical heating elements 23 which consists of a frame 24 on which is wrapped nichrome wire 25. Although this wire is shown as rectangular in cross-section, it is preferred that the same be round so that it will readily deflect any material which may fall thereon from the food above the same. It is also apparent that the specific construction of these heating elements may be varied without changing their function.

The side members of the frame 24 are made up of parallel, coextensive members whose ends 26 are turned in opposite directions after having been extended through slots in the front and rear walls of the inner case 19 of the toaster (Fig. 2). Thus, the heating elements 23 are secured in vertically spaced relationship above and below each of the openings 18—20 of the housing 10 and case 19, respectively and being thus disposed, the food, which is supported on vertically spaced groups of rails 27, is toasted on both sides simultaneously.

The supporting rails 27 consist of lengths of wire whose rear ends extend through apertures in the rear wall of the inner case 19 and their forward ends are looped, in the manner shown in Figures 2 and 3, over an outwardly turned flange 28 below each discharge opening 20 in the case 19. Thus, the toast lying on the rails 27 is directed thereby through the discharge openings 18 of the housing 10.

Figure 5:
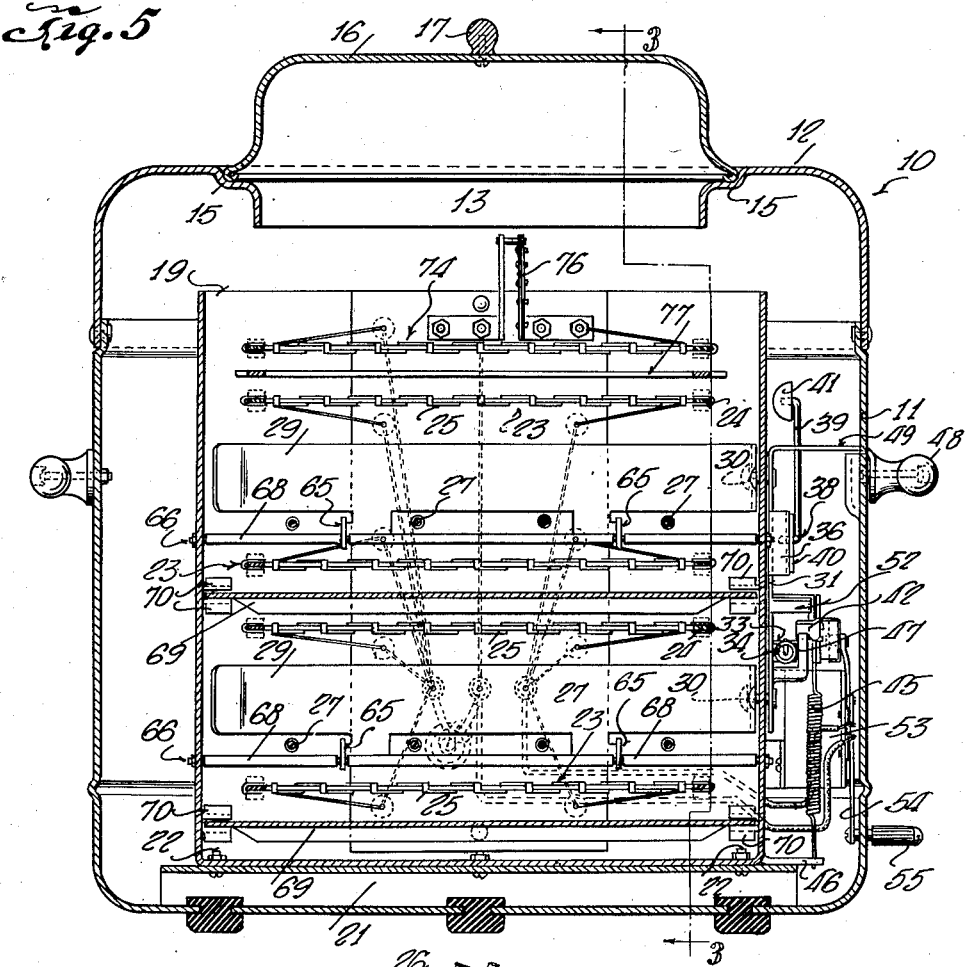
Figure 5 is a vertical sectional view of the toaster on still a larger scale rotated ninety degrees from the showing in Figure 3 and taken on line 5—5 of Figure 3.

Attending each group of supporting rails 27 is a kicker plate 29. (Figs. 3 and 5.) Each kicker plate consists of the metal strip bearing the same reference numeral 29, one end of which is free while the opposite end is pivoted at 30 to a plate 31 exteriorly of the case 19, through a slot 32 in the wall of the latter. The slots 32 are horizontal and vertically spaced as shown in Figure 2. It is apparent therefore that when the plate 31 is reciprocated horizontally, the kicker plates 29 will be moved in like manner within the case 19.

A projection 33 is struck from and extends outwardly at right angles to the plate 31 and to this projection is attached the rear end of a coil spring 34. The forward end of this spring is retained in an aperture 35 in the front wall of the case 19. Thus, the spring 34 urges the plate 31 normally towards the front of the case 19 and similarly, the kicker plates 29.

An arm 36 is formed on the forward end of the plate 31 to extend rearwardly and in parallelism with the plate. This arm has a zig-zag slot 37 therein in which is disposed the looped end 38 of a wire 39 which latter extends rearwardly and is bent outwardly to extend through an aperture in a parallel extension 40 formed on the rear well of the case 19, after which the wire 39 is turned upwardly to receive a weight 41. When the plate 31 is thrust rearwardly against the resistance of spring 34, the force of the latter tending to urge the plate forwardly will meet resistance presented by the loop 38 of wire 39 coming into contact with the angles of the zig-zag slot 37, combined with the effort required to overcome the impetus of the swinging weight 41. The result is a slowing down of the speed of the plate 31 and consequently the kicker plates 29.

To secure the kicker plates 29 in retracted position, a latching mechanism is provided consisting of a lever 42, pivoted at 43 to an arm 44 formed on the rear wall of the case 19 and extending forwardly in parallelism with the side thereof, as shown in Figure 2. The forward end of the lever 42 is turned inwardly at right angles to the longitudinal axis of the lever and is held normally downward by a coil spring 45, one end of which is attached to the lever while its opposite end is secured to an outwardly extending tab 46 formed on the lower edge of the side wall of the case 19. The projection 33 previously referred to constitutes a stop for the lever 42, serving to limit its downward displacement.

Struck from the plate 31 and turned at right angles thereto is a substantially L-shaped arm 47. During inoperative periods of the toaster, the upturned end of the arm 47 bears against the inwardly turned end of the lever 42, as shown in Figure 2, thus preventing the plate 31 from shifting rearwardly during movement of the toaster from place to place.

In order to set the kicker plates 29 preparatory to ejecting toast, the plate 31 is moved rearwardly by means of a knob 48 Figure 1 exteriorly of the housing 10, which is attached to a flange 49 turned outwardly from the top edge of the plate 31. The flange extends through a horizontal slot 50 in the wall of housing 10 to receive the knob 48. A finger grip 51 is affixed to the wall of the housing 10 rearwardly of the knob 48 as a purchase for the finger as the knob 48 is moved rearwardly as by the thumb.

As the plate 31 is moved rearwardly, an arm 52 formed on and extending at right angles from the forward edge of the plate is moved against the inwardly turned end of lever 42. It will be observed in Figure 2 that the arm 52 and the end of lever 42 are disposed at corresponding angles so that the lever will be lifted against the tension of spring 45 and the arm 52 moves under the lever. The plate 31 is thus latched in retracted position until release by a timer 53.

The timer 53 is generally conventional and hence is not illustrated in detail. However, it is to be observed that the timer is set by means of a crank 54 having a handle 55 which, as apparent in Figure 1, extends through an arcuate slot 56 in the housing 10. Indicia such as "Dark," "Medium" and "Light" are provided adjacent the slot 56 to indicate the position of the timer handle 55 and to predetermine the toasting period of the food. Formed on the crank 54 about its point of rotation is a cam 57 on which operates a follower 58, the latter being mounted on one end of an arm 59, pivoted at 60 to the timer housing.

To prepare the toaster for operation, the timer crank 54 is moved to predetermine the duration of the toasting period which positions the cam follower 58 on the periphery of the cam 57. Until this is done, the plate 31 cannot be retracted. However, by thus setting the timer, the arm 59 is rocked on its pivot 60 so that the roller 61 carried by the arm will bear downwardly on the tail of the lever 42, raising the forward end thereof against the resistance of spring 45. This permits the member 47 to pass freely under this free end of lever 42 so that the plate 31 and its associated elements may be moved rearwardly by means of the handle 48, under resistance of the spring 34.

As the actuating plate 31 is moved to the retracted position, the aforementioned angular arm 52 formed on the plate travels under the inwardly turned forward end of lever 42, following which the spring 45 retains the lever in latched engagement with the arm 52 until the timer cam 57 completes its cycle. When this occurs, the follower 58 will recede in a recess 64 in the cam, causing the arm 59 to yield the lever 42 to the action of spring 45 which latter exerts a downward pull on the forward end of the lever, allowing the arm 52 to ride over the top of the inwardly turned end of lever 42. In this manner, the plate 31 is released to the action of spring 34 which propels the plate towards the front of the housing.

When the timer is set in the manner described, a lug 62 attached to the arm 59 is brought into engagement with one of a pair of switch contacts 63, closing the same to complete the circuit through all of the heating elements 23. When the time cycle has been completed, the follower 58 falls into the recess 64 in the cam 57, whereupon the lug 62 recedes from the contacts 63 thereby opening the circuit to the heating elements.

Returning to the kicker plates 29, it will be observed in Figure 3 that a pair of serrated bars 65 are formed on the lower edge of each of these plates and are disposed to lie between the supporting rails 27. These bars will be hereinafter referred to as the inward carriage bars. Since the plates 29 are pivoted at 30 to the actuating plate 31, they are capable of limited rotative displacement, hence the inward carriage bars 65 are constrained to move up and down as the kicker plates 29 are moved rearwardly and forwardly. In this manner, the bars 65 are effective to receive the untoasted bread and convey the same inwardly for disposition in toasting relationship with the heating elements 23. To permit this displacement of the inward carriage bars 65, a rod 66 is passed from one side of the case 19 to the other through openings in the ends of the said bars, between which there are spacers 68 to maintain relative parallelism of the bars. The forward ends of the slots are deflected downwardly as shown in Figure 2, hence as the slices of bread or the like are projected forwardly by the kicker plates and bars, the latter are caused to recede downwardly therefrom as the transverse rods 66 enter the deflected ends of slots 67. Thus, the toast, which now protrudes through the openings 18 in the front of the housing 10, is released by the inward carriage bars and may be withdrawn freely from the housing.

Figure 4:
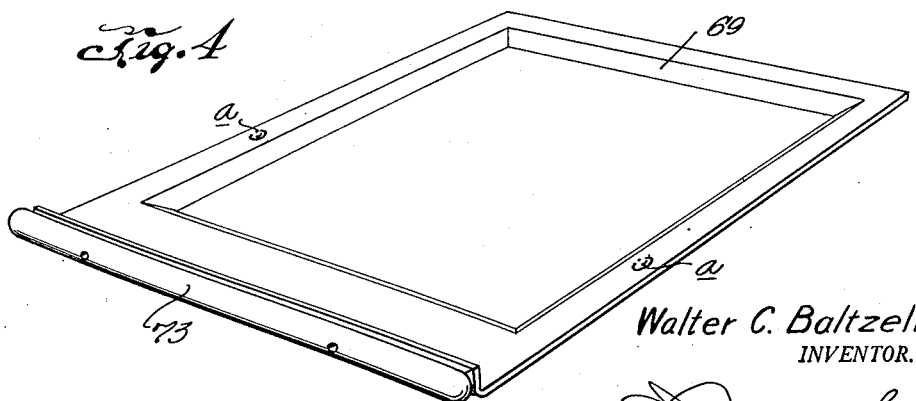
Figure 4 is a detail perspective view of one of the drip pans.

Below each group of supporting rails 27 there is provided a drip pan 69, shown in detail in Figure 4. These pans are adapted to receive material such as melted cheese, butter and the like overflowing the bread on the rails 27 and are slidably disposed between parallel lugs 70 struck inwardly from the side walls of the case 19. The forward ends of each of the uppermost lugs 70 are deflected upwardly, as shown in Figure 3, as an aid in receiving the edges of the trays or pans 69 between the lugs. The pans are slid into slots 71 in the front of the case 19 which align with similar slots 72 in the housing 10. A handle 73 is provided on each of the pans 69 to manipulate the same. Also dimples $a$ are provided in the flanged side of the drip pan for frictional engagement with lugs 70 to prevent too free displacement of the pans with respect thereto.

Referring again to the warming chamber 14, it will be observed in the wiring diagram shown in Figure 7 that a heating element 74 is arranged in an individual circuit 75 and is disposed immediately below the chamber 14. A thermostat 76 in the circuit 75 maintains in the chamber a predetermined temperature irrespective of the temperature of the heating elements 23.

In order that the heating elements 23 will not influence the temperature of the chamber 14, a separator plate 77 is interposed between the heating element 74 and the topmost heating element 23. Moreover, this plate serves as a heat reflector to intensify the heat of the elements 23.

Manifestly, the construction as shown and described is capable of some modification and such modification as may be construed to fall within the scope and meaning of the appended claims is also considered to be within the spirit and intent of the invention.

What is claimed is:

1. An electric cooking apparatus comprising a housing having vertically spaced and horizontally elongated openings in its front wall, a case within said housing having openings of similar arrangement and shape in register with the openings of said housing, a group of food supporting rails within said case and aligned with each of said openings, a slidable plate parallel with the outer face of one wall of said case, a spring resisting retraction of said plate, a food kicker plate movable longitudinally over each group of said food supporting rails, means pivoting each of said kicker plates to said slidable plate through vertically spaced, horizontal slots in the wall of said case, a pair of serrated inward carriage bars carried by each of said kicker plates, and extending forwardly between said supporting rails, an electric circuit, a heating element in said circuit above and below each of said groups of food supporting rails, a drip pan also below each group of supporting rails, an adjustable timer in said circuit for predetermining the duration of energization of said heating elements, means releasable by said timer for holding said slidable plate, kicker plates and inward carriage bars in retracted position preparatory to a forward thrust and means to effect downward displacement of said inward carriage bars at the end of their forward thrust.

2. An electric toaster comprising a housing having vertically spaced and elongated horizontal openings in its front wall, a case within said housing having openings corresponding to those in said housing, a food support aligned with each of the openings in said case, an electric circuit, a heating element in said circuit above and below each of said supports, a removable drip pan also below each of said supports, a food kicker plate slidable longitudinally on each of said supports, a serrated inward carriage bar affixed to and extending forwardly from each of said kicker plates and disposed normally above the plane of said supports, an actuating plate slidable in parallelism with the outer wall surface of said case and to which said kicker plates are pivoted through horizontal slots in the wall of said case, a spring for urging said actuating plate normally in a forwardly direction, a timer in said circuit for predetermining the energized periods of said heating elements, a latch releasable by said timer for holding said actuating plate in retracted position to dispose said kicker plates and bars in ejecting position and means to effect downward retraction of said inward carriage bars during forward thrust thereof.

3. An electric cooking apparatus comprising a housing having elongated, horizontal openings in its front wall, a case within said housing having openings of like size and shape and in register with the openings of said housing, a plurality of horizontal food supporting rails within said case and aligned with said openings, a kicker plate slidable over each group of supporting rails to eject food in its forward thrust toward said openings, a plurality of serrated inward carriage bars attached to each of said kicker plates and disposed normally above the plane of said supporting rails and adapted to engage and inwardly convey food on said rails, an electric heating element above and below each of said groups of food supporting rails, an electric circuit, a timer in said circuit for predetermining the period of energization of the heating elements in juxtaposition to said supporting rails, spring loaded means exteriorly of said case for actuating said kicker plates and bars, means for causing said serrated bars to move to a position below the plane of said supporting rails during their forward movement and means releasable by said timer for holding said spring loaded means in retracted position.

4. In a food toaster, a case having horizontal, vertically spaced openings in the front wall thereof and horizontal, vertically spaced slots in its side wall one of which slots is downwardly deflected at its forward end, a food support aligned with each of said front openings, food ejecting means slidable on each of said supports toward and from said openings, inward carriage bars attached to said ejecting means for drawing food into said case, rods extending through the forward ends of said bars and having their ends slidable in the deflected slots in said case to effect downward movement of said bars at the end of their forward thrust, an electric circuit, a heating element in said circuit above and below each of said supports, a drip pan below each of said supports, a plate slidable in parallelism with the outer wall surface of said case, and to which each of said food ejecting means is pivoted through the companion slots in said casing wall, a lever pivoted stationarily with respect to said casing adjacent said plate, a spring resisting retraction of said plate, a latch on the latter engaging said lever, a timer for controlling said circuit, means actuated by said timer for releasing said latch to yield said plate to the action of said spring to actuate said food ejecting means and means for regulating the speed of said ejecting means.

WALTER C. BALTZELL.

REFERENCES CITED

The following references are of record in the file of this patent:

UNITED STATES PATENTS

| Number | Name | Date |
|---|---|---|
| 1,349,529 | Pattison | Aug. 10, 1920 |
| 1,694,762 | Ackerman | Dec. 11, 1928 |
| 1,862,965 | Maragos | June 14, 1932 |
| 1,903,089 | Browning | Mar. 28, 1933 |
| 1,937,562 | Ginder | Dec. 5, 1933 |
| 2,001,362 | Ireland | May 14, 1935 |
| 2,036,210 | Graham | Apr. 7, 1936 |
| 2,042,595 | Graham | June 2, 1936 |
| 2,241,103 | Uhlrig | May 6, 1941 |
| 2,319,997 | Ireland | May 25, 1943 |
| 2,429,736 | Wales | Oct. 28, 1947 |
| 2,471,649 | Page | May 31, 1949 |